Oct. 12, 1937.  M. E. RUTHERFORD  2,095,575
BRAKE MECHANISM
Filed July 15, 1936   2 Sheets-Sheet 1
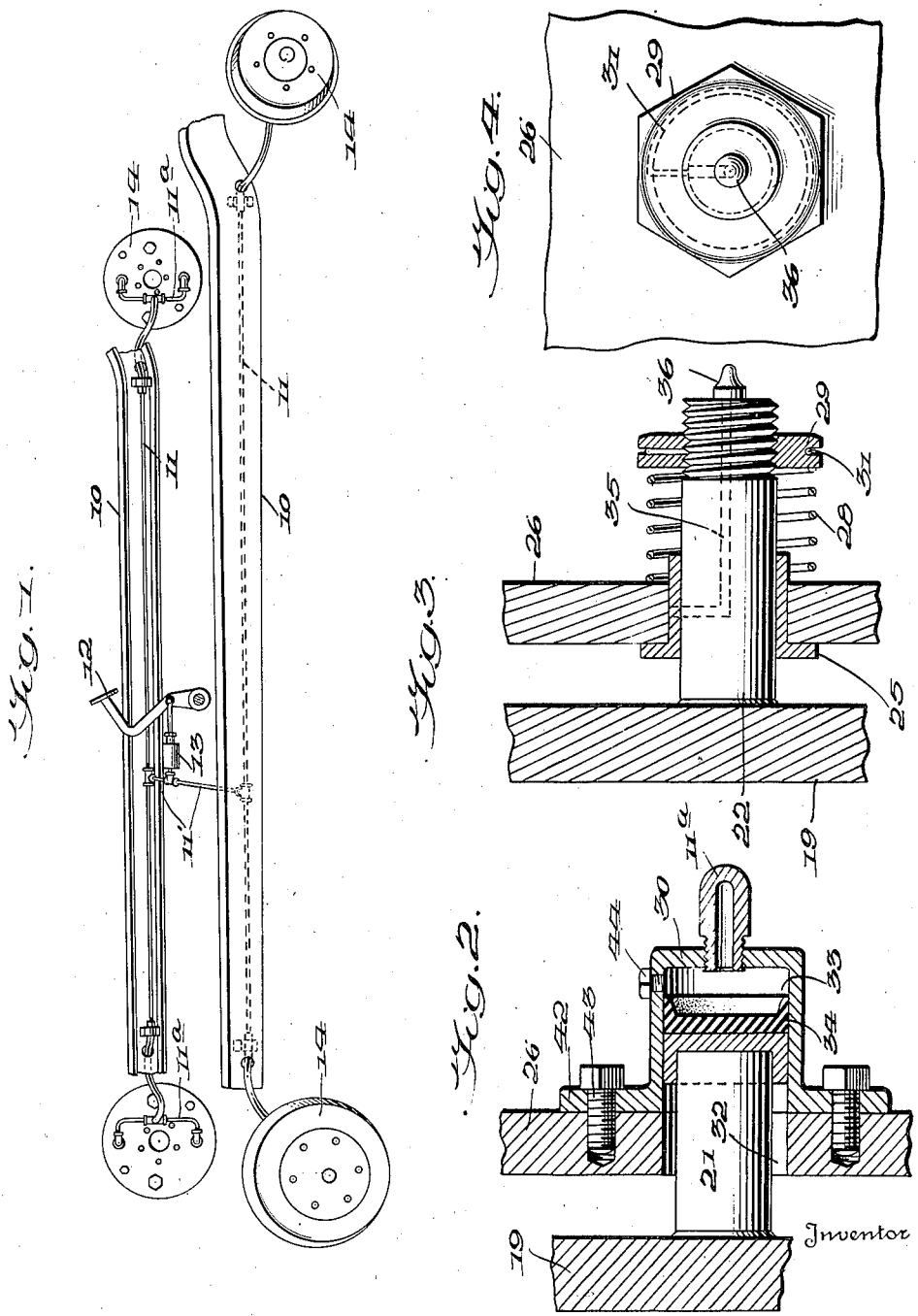

Oct. 12, 1937.    M. E. RUTHERFORD    2,095,575
BRAKE MECHANISM
Filed July 15, 1936    2 Sheets-Sheet 2
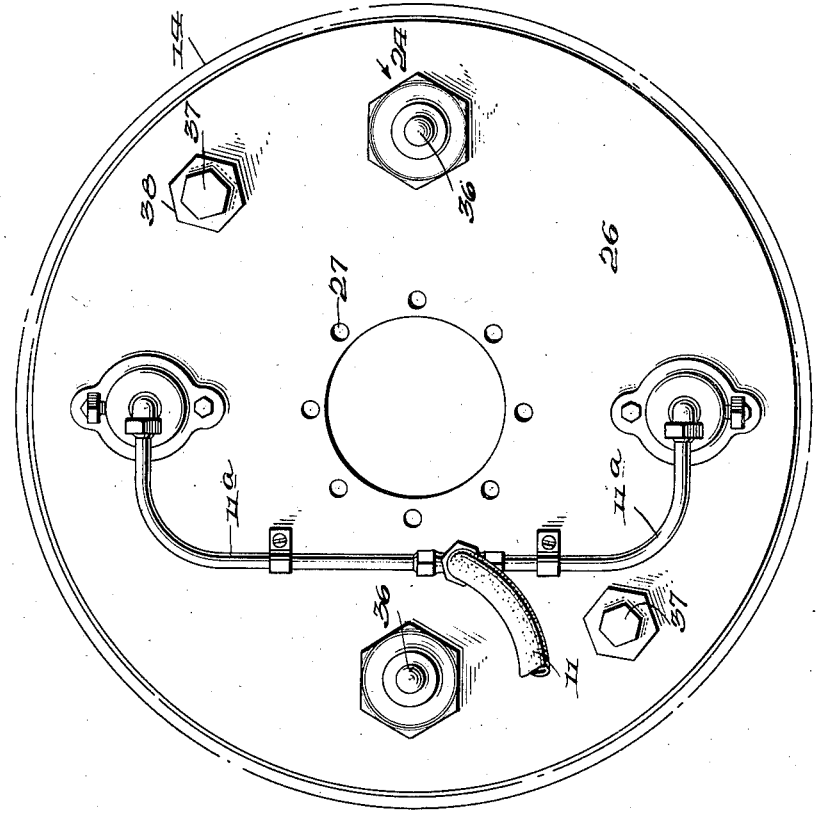
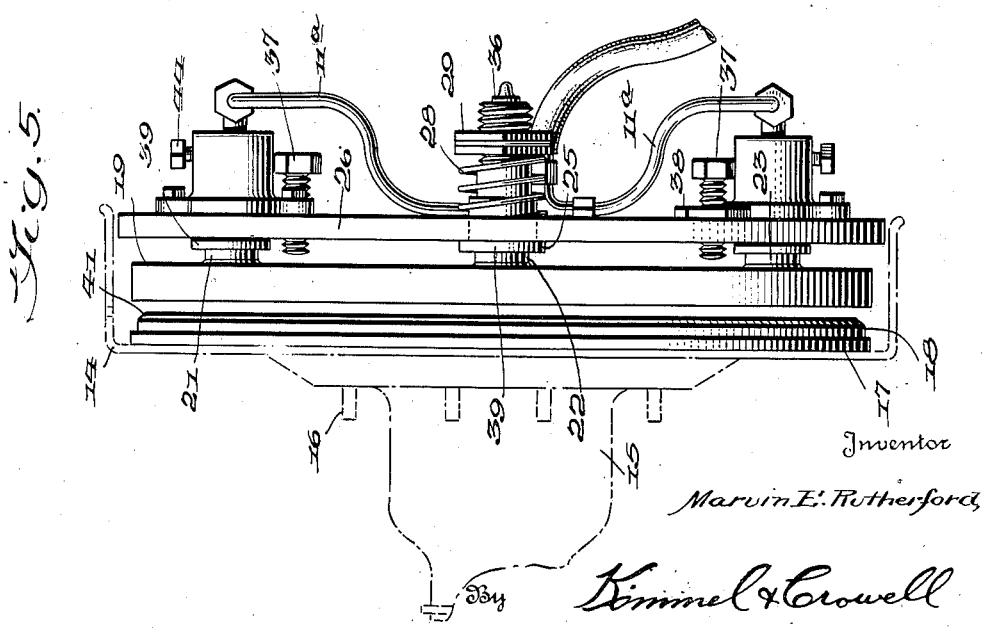
Inventor
Marvin E. Rutherford,
By Kimmel & Crowell
Attorney Patented Oct. 12, 1937

2,095,575

UNITED STATES PATENT OFFICE 2,095,575

BRAKE MECHANISM

Marvin E. Rutherford, Abilene, Tex., assignor of one-fourth to William G. Williams, Abilene, Tex.

Application July 15, 1936, Serial No. 90,791

5 Claims. (Cl. 188—71)

This invention relates to a brake mechanism and more particularly but not necessarily to hydraulic brakes for automobiles, trucks and the like.

It is one object of this invention to provide a brake mechanism of improved construction of the hydraulic type.

Another object is to provide a brake mechanism of the hydraulic type that shall be positive in action and so constructed as to be adaptable for the conventional wheels of automobiles, trucks and the like.

Another object is to provide a brake mechanism designed to increase braking capacity on a wheel of given size, as well as to substantially eliminate the generation of heat and friction between the parts while at rest, and to materially reduce the likelihood of deformity of the parts through long and continued use.

A further object is to provide a brake mechanism having the above characteristics that will not only be simple in structure and comparatively cheap to manufacture, but will be rugged, efficient in operation and particularly adapted for the purpose for which it is intended.

The above and other objects will be made apparent through the further description of the invention when taken in connection with the accompanying drawings wherein like reference characters refer to like parts. It is to be distinctly understood that the drawings are not a definition of the invention but illustrate one form in which the invention may be carried out. The scope of the invention will be defined by the appended claims.

In the drawings:—

Figure 1 is a perspective view more or less diagrammatic showing a portion of the frame and wheels of an automobile together with the brake structure embodying the invention, Figure 2 is a fragmental sectional detail view embodying the invention, Figure 3 is a fragmental view in section showing a shaft mounting embodying the invention, Figure 4 is an elevational view of Figure 3, as viewed from the right, Figure 5 is an edge elevational view showing a detailed construction of the brake mechanism embodying the invention, and Figure 6 is a front elevational view of Figure 5.

For the purpose of illustrating the invention there is here shown a frame 10 of an automobile on which are mounted the fluid lines 11 one of which leads to each of the wheels. The present invention is particularly adapted for hydraulic brakes, and as here shown a conventional brake pedal 12 operably connected to a master cylinder 13 for supplying fluid pressure in any of the conventional manners which, of course, forms no part of the present invention. The lines 11 are connected with the pressure cylinder 13 by means of suitable feed lines 11'.

The brake structure as best shown in Figure 5 utilizes the usual brake drum 14 and hub 15 on which a wheel, not shown, is adapted to be mounted on the studs 16. The inner face of the brake drum 14 carries a plate 17. This plate 17 has mounted thereon a brake facing or lining 18 which substantially covers one entire face of the plate. Both the facing 18 and the plate 17 are rigidly fixed to the inner face of the brake drum 14 by means of rivets or the like and rotate with the wheel. The plate 17 is in the form of an upstanding flat circular disc. The plate 17 and lining 18 constitute a contact element and cooperating with the latter for brake application is a pressure plate 19 in the form of a flat upstanding disc constituting a braking element.

The co-operating pressure plate 19 is non-rotatably mounted and has on its inner face four pins or rods 21, 22, 23 and 24. Two of these pins 22 and 24 extend from diametrically opposite sides of the plate through a bushing 25 provided in a stationary plate 26 in the form of an upstanding flat circular disc. This plate 26 is mounted by means of the openings 27 to the axle housing, not shown, of the automobile, truck or the like. Each of the pins 22 and 24 extends inwardly a sufficient distance to accommodate a spring 28 retained thereon by a nut 29 having a spring lock 31 in the form of a circumferentially extending groove. These springs 28 have their respective ends in abutment with the nuts 29 and plate 26 and operate to maintain the pressure plate 19 in open position as is apparent from the drawings.

The other two pins 21 and 23 are mounted on diametrically opposite sides of the pressure plate 19 and in equi-distant relation to the pins 22 and 24. These pins 21 and 23 are somewhat shorter than the pins 22 and 24 and loosely extend through openings 32 in the stationary plate 26. Adjacent each of the openings 32 is a cylinder 33 having its inner face in alignment with the wall of the opening 32 and having one end in open communication with the opening, the opposite end 30 of the cylinder being closed. Each of the cylinders is rigidly secured to the plate 26 in any suitable manner such as by a flange 42 having suitable bolts 43 extending therethrough and into the plate. Slidably mounted within each cylinder 33, and rigidly secured to the projecting end of the associated pin 21 or 23 is a piston 34 which may be of any well-known leak proof construction. The fluid lines 11 are in communication with discharge lines 11a which open into the closed ends of the cylinders 33. Adjacent the closed end thereof, each of the cylinders is provided with an opening normally closed by means of a plug 44.

Means is provided for adjusting the inner movement of the pressure plate 19, which means consists of a pair of stop members 37 extending at diametrically opposite points through each plate. Each stop member is threaded through the plate and is provided with a lock nut 38 as best shown in Figure 5. Adjacent to and on the inner face of the plate 26, each of the pins 21, 22, 23 and 24 carries a dust-proof washer 39. The pins 22 and 24 have a central opening 35 associated with their ends, the latter being provided with a grease cup 36 which is connected to the oiling system of the car.

The pressure plate 19 which is mainly supported by the pins 22 and 24 is additionally supported by the pins 21 and 23. This gives to the pressure plate not only rugged construction but assists in positive operation.

The brake facing 18 is preferably bevelled at 41 so that anywhere in the facing it will not extend out of the diameter of the plate.

The operation of the mechanism is as follows: Upon applying pressure to the brake pedal 12, the fluid in the master cylinder 13 is forced through the lines 11', 11 and 11a to the several cylinders 33. Each of the pressure plates 19 have two cylinders disposed on diametrically opposite sides which are adapted to exert like pressure whereby there is given to the pressure plate an even and direct inward movement.

Upon the release of the pressure within the cylinders, the pressure plates are automatically withdrawn to their inoperative positions by the action of the springs 28 which constantly exert pressure on the nuts 29 carried by the pins 22 and 24. Thus it will be seen that any likelihood of dragging brakes is eliminated. It should be noted that the contact between the pressure plate 19 and brake lining 18 provides an unusually large braking surface; thereby materially reducing wear while providing maximum effectiveness in operation.

While a single embodiment of the invention has been illustrated and described, it is expected that a person skilled in the art may make certain changes, modifications, substitutions, additions and omissions in the construction of the brake mechanism without departing from the spirit and scope of the appended claims.

What I claim is:—

1. In a brake mechanism, a brake drum adapted to be fixedly secured to the hub of a wheel, a contact plate within and fixed to the drum, a stationary plate, a horizontally shiftable nonrevoluble pressure applying plate interposed between and normally spaced from said other plates and acting when shifted in one direction to abut and coact with said contact plate to provide for a braking action, said stationary plate having mounted therein spaced bushings, spaced rods fixedly fixed to and extending inwardly from said pressure applying plate, said rods mounted in said bushings and carrying spring controlling structures therefor, said structures bearing at their outer ends against the inner face of said stationary plate, said stationary plate being formed with spaced openings spaced from said bushings, spaced shifting elements for, fixed to and extending inwardly from said pressure applying plate, said elements passing through and spaced from the walls of said openings, fluid pressure applying structures communicating at their outer ends with and having their inner faces flush with the walls of said openings, said structures including fluid pressure operated pistons connected to the inner ends of said elements for shifting them, and means for simultaneously controlling a supply of fluid pressure to said structures to provide for the operation of the pistons to shift said elements.

2. The invention as set forth in claim 1 having said stationary plate of uniform thickness throughout, the said bushings extended from the inner face of the stationary plate and being formed at their outer ends with flanges bearing against the outer face of the stationary plate, the pressure applying and contact plates being in the form of circular discs.

3. The invention as set forth in claim 1 having said bushings of greater length than the thickness of the stationary plates, and said rods being formed with angle-shaped lubricant conducting channels leading from their inner ends and opening at the peripheries thereof.

4. In a brake mechanism a shiftable plate for applying pressure to a brake drum to provide a braking action, a stationary plate arranged inwardly of and spaced from said other plate, bushings mounted in and extended from the inner face of the stationary plate, rods fixed to and extending inwardly from the shiftable plate, spring controlling structures for and mounted on said rods inwardly of the stationary plate, said structures bearing at their outer ends against the inner face of the stationary plate, said stationary plate being formed with openings, cylinders having outer open ends and flanges at such ends anchored to the inner face of said stationary plate, the inner faces of said cylinders forming flush continuations of the walls of said openings, shifting elements for and anchored to the inner face of said shiftable plate, said elements extending through and being of less diameter than said openings, fluid pressure operated pistons within said cylinders and mounted on the inner ends of said elements for shifting them, and means connected to the inner ends of the cylinders for simultaneously supplying fluid pressure thereto.

5. The invention as set forth in claim 1 having said bushings of greater length than the thickness of and extended inwardly from the stationary plate.

MARVIN E. RUTHERFORD.